United States Patent Office 3,452,045
Patented June 24, 1969

3,452,045
(TRICHLOROMETHYLTHIO)DICARBOXIMIDE COMPOUND
Carleton W. Roberts, Midland, and Gale D. Travis, Shepherd, Mich., assignors to The Dow Chemical Company, Midland, Mich., a corporation of Delaware
No Drawing. Filed Dec. 23, 1966, Ser. No. 604,156
Int. Cl. C07d 27/54, 27/00
U.S. Cl. 260—326                     1 Claim

ABSTRACT OF THE DISCLOSURE

The present invention is directed to N-(trichloromethylthio) -1,2,3,4,9,9 - hexachloro-1,4,4a,5,6,7,8,8a-octahydro-1,4-methanonaphthalene-6,7-dicarboximide, a compound having the following formula:

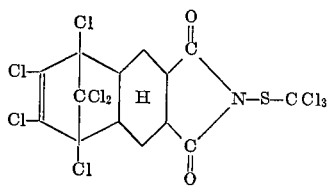

This compound is useful as a substrate in the practices of vapor phase chromatography.

---

As set for hereinabove in the abstract, the present invention is directed to N-(trichloromethylthio)-1,2,3,4,9,9-hexachloro - 1,4,4a,5,6,7,8,8a - octahydro - 1,4 - methanonaphthalene-6,7-dicarboximide:

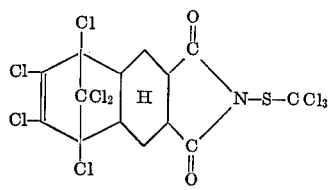

This compound is a crystalline solid at room temperature. It is prepared by the reaction of N-sodio-1,2,3,4,9,9-hexachloro - 1,4,4a,5,6,7,8,8a - octahydro - 1,4 - methanonaphthalene-1,2-dicarboximide (hereinafter the "N-sodio imide");

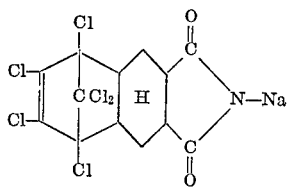

and trichloromethanesulfenyl chloride (Cl—S—CCl$_3$). The reaction is carried out in the presence of an inert liquid as a reaction medium. The employment of such medium, or the identity of the inert liquid if employed, is not critical; however, the use of the medium provides for the dispersion and intimate contacting of the reactants, and is preferred. Preferred liquids include water and the loweralkanols, such as methanol and ethanol.

The reaction of the N-sodio imide and trichloromethanesulfenyl chloride goes forward at temperatures over a wide range, for example, from −20° to 150° C. Generally, though, temperatures in the range of −10° to +30° C. are preferred. The reaction goes forward under atmospheric pressures of a wide range; however, no advantage ordinarily results from the use of subatmospheric or superatmospheric pressures, and, therefore, the preparation is ordinarily carried out at atmospheric pressures.

The amounts of the reactants to be employed are not critical, some of the desired product resulting when the reactants are employed in any amounts. The reactants are consumed in amounts which represent equimolecular proportions, and it is usually preferred to supply the N-sodio imide reactant and the trichloromethanesulfenyl chloride reactant in such amounts. The N-sodio imide reactant is conveniently prepared in situ from the corresponding free imide:

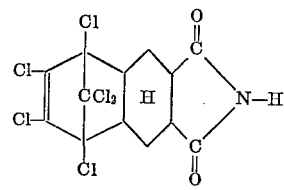

and sodium hydroxide. When this mode of operation is employed, good results are obtained when employing the free imide, sodium hydroxide, and trichloromethanesulfenyl chloride in equimolecular amounts. Regardless of the particular mode of operation, however, the reaction goes forward readily, with the preparation of the desired product and of sodium chloride as byproduct.

In carrying out the reaction, the N-sodio imide reactant and trichloromethanesulfenyl chloride reactant are contacted with one another. Conveniently, the contacting is carried out by first reacting the free imide compound and sodium hydroxide in an inert liquid reaction medium to prepare the N-sodio-imide and thereafter adding the trichloromethanesulfenyl chloride reactant. The reaction goes forward readily, and is generally complete upon the completion of the contacting of the N-sodio imide and trichloromethanesulfenyl chloride reactants. However, it is sometimes preferred to permit the reaction mixture to stand for a period of time to assure completion of the reaction. Following the completion of the reaction, or when the reactants have been contacted for as long a period of time as it is desired, the product-containing reaction mixture can be employed for the useful purposes of the present invention. Alternatively, the product can be separated from the reaction mixture by conventional separation procedures, such as, for example, filtration, decantation, evaporation under subatmospheric pressure of the inert liquid reaction medium, and the like.

The separated product can be employed for the useful purposes of the present invention, or can be purified by conventional procedures before being so employed. Representative purification procedures include washing with an appropriate liquid which is a solvent for impurities but not for the product; recrystallization and the like.

The following example illustrates the best mode now known for the present invention and will enable those skilled in the art to practice the same.

Example 1.—N-(trichloromethylthio)-1,2,3,4,9,9-hexachloro-1,4,4a,5,6,7,8,8a-octahydro-1,4-methanonaphthalene-6,7-dicarboximide 1,2,3,4,9,9 - hexachloro - 1,4,4a,5,6,7,8,8a - octahydro-1,4-methanonaphthalene-6,7-dicarboximide (42.5 grams; 0.10 mole) and 4.94 grams of 97 percent sodium hydroxide (0.12 mole) dissolved in 4.80 grams of water were added to 250 milliliters of ice-water mixture. 75 milliliters of ethyl alcohol were also added. The resulting mixture was maintained at a temperature of 0° C. while trichloromethanesulfenyl chloride (18.6 grams; 0.10 mole) was added to the mixture. The addition was carried out portionwise over a period of one hour. Thereafter, the reaction mixture was stirred for a period of one hour at 0° C.

The reaction mixture was then filtered under subatmospheric pressure to obtain the desired 1,2,3,4,9,9-hexachloro - 1,4,4a,5,6,7,8,8a - octahydro-N-(trichloromethylthio)-1,4-methanonaphthalene-6,7-dicarboximide product as a residue. This product residue was purified three successive times, each time by washing with 300 milliliters of boiling water. After these purification procedures the product was dried in a vacuum oven at 80° C. for 24 hours and the product so obtained found to melt at 210° C. After recrystallization from carbon tetrachloride, the product melted at 218–220° C. Elemental analysis was conducted.

Calculated for $C_{14}H_8Cl_9NO_2S$: C, 29.31; H, 1.41; Cl, 55.66; N, 2.44; S, 5.59. Found, C, 30.90; H, 1.36; Cl, 54.80; N, 2.43; S, 3.82.

Infrared analysis confirmed the identity of the product, but suggested the presence of a minor amount of the starting imide.

Illustrative of the utility of the compound of the present invention, such compound is taken up in solution in a solvent, and the solvent solution intimately and thoroughly mixed and stirred with an amount of chemically cleaned diatomaceous earth representing from about twenty to about four times the weight of the compound of the present invention; solvent is removed by vaporization to obtain a treated infusorial earth uniformly coated with and bearing a deposit of the compound of the present invention. With repulverization if necessary, the treated infusorial earth is then filled under suction and with the aid of sonic vibration into a coiled otherwise empty column for use in vapor phase chromatography at temperatures at which the compound of the present invention is mechanically stable. The chromatographic separations upon such column, with the compound of the present invention functioning as substrate, are useful in research procedures.

We claim:
1. Compound of the formula

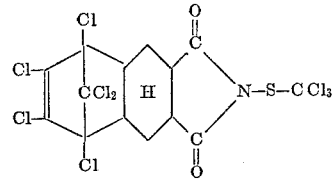

References Cited
UNITED STATES PATENTS 3,280,143   10/1966   Hayes _____ 260—326
2,553,770   5/1951   Kittleson _____ 260—326

ALEX MAZEL, *Primary Examiner.*

J. A. NARCAVAGE, *Assistant Examiner.*

U.S. Cl. X.R.

55—67, 386; 210—31